(12) United States Patent
Colliat et al.

(10) Patent No.: US 6,449,619 B1
(45) Date of Patent: Sep. 10, 2002

(54) METHOD AND APPARATUS FOR PIPELINING THE TRANSFORMATION OF INFORMATION BETWEEN HETEROGENEOUS SETS OF DATA SOURCES

(75) Inventors: George Colliat, Woodside; Marina D'Cruz; Steve Lyon, both of San Mateo; Jonathan Scott, San Francisco; Stefan Sieradzki, Mountain View, all of CA (US)

(73) Assignee: DataMirror Corporation, Markham (CA)

( * ) Notice: Subject to any disclaimer, the term of this patent is extended or adjusted under 35 U.S.C. 154(b) by 0 days.

(21) Appl. No.: 09/342,155

(22) Filed: Jun. 23, 1999

(51) Int. Cl.⁷ .............................................. G06F 17/30
(52) U.S. Cl. ...................................................... 707/102
(58) Field of Search ................................ 707/1, 4, 5, 9, 707/101.1, 200, 100, 101, 102, 103

(56) References Cited

U.S. PATENT DOCUMENTS

| | | | |
|---|---|---|---|
| 5,117,289 A | 5/1992 | Frley et al. | 358/140 |
| 5,182,642 A | 1/1993 | Gersdorff et al. | 358/133 |
| 5,283,887 A | 2/1994 | Zachery | 395/500 |
| 5,414,780 A | 5/1995 | Carnahan | 382/276 |
| 5,428,593 A | 6/1995 | Kanai et al. | 369/59 |
| 5,433,657 A | 7/1995 | Bovone | 451/388 |
| 5,652,879 A | 7/1997 | Harris et al. | 395/612 |
| 5,819,011 A | 10/1998 | Fitzpatrick et al. | 395/110 |
| 5,835,740 A | 11/1998 | Wise et al. | 395/309 |
| 5,842,033 A | 11/1998 | Wise et al. | 395/800.01 |
| 5,870,756 A | 2/1999 | Nakata et al. | 707/200 |
| 5,878,422 A | 3/1999 | Roth et al. | 707/100 |
| 5,884,282 A | 3/1999 | Robinson | 705/27 |
| 5,937,415 A * | 8/1999 | Sheffield et al. | 707/204 |
| 6,014,670 A * | 1/2000 | Zamanian et al. | 707/101 |
| 6,195,662 B1 * | 2/2001 | Ellis et al. | 707/103 |
| 6,208,990 B1 * | 3/2001 | Suresh et al. | 707/6 |
| 6,308,168 B1 * | 10/2001 | Dovich et al. | 707/1 |

FOREIGN PATENT DOCUMENTS

| | | | |
|---|---|---|---|
| EP | 0587324 A1 | 3/1994 | H03M/7/40 |
| EP | 0660580 A2 | 6/1995 | H04N/1/333 |
| EP | 0660580 B1 | 6/1995 | H04N/1/333 |
| EP | 0587324 B1 | 3/1997 | H03M/7/40 |
| EP | 0875854 A2 | 11/1998 | G06T/1/20 |
| EP | 0884910 A1 | 12/1998 | H04N/7/24 |
| EP | 0891089 A1 | 1/1999 | H04N/7/24 |

* cited by examiner

*Primary Examiner*—Safet Metjahic
*Assistant Examiner*—Cam-Linh Nguyen
(74) *Attorney, Agent, or Firm*—Cooper & Dunham LLP

(57) ABSTRACT

The invention provides a method and apparatus for pipelining the transformation of information between heterogeneous sets of data sources. The invention avoids intermediate data staging by constructing metadata that allow the acquisition of data in an order that matches the order in which the target data must be delivered. In a further feature of the invention, the acquisition, transformation, and delivery stages of an interface between two applications are pipelined as three processes that execute simultaneously on a continuous flow of data. Pipelining is a well-known technology that has been in use in operating systems, such as UNIX pipes and more recently by Torrent systems, to optimize the usage of multiprocessor machines. Uniquely, the invention applies pipelining technology to data transformation between heterogeneous data sources.

9 Claims, 18 Drawing Sheets

```
01 Order
      02 OrderID          PIC 9(5)
      02 Sales-Rep        PIC X(30)
      02 Company-Name     PIC X(40)
      02 Contact-Name     PIC X(30)
      02 Contact-Title    PIC X(30)
      02 Phone            PIC X(20)
      02 Order-Date       PIC 99/99/9999
      02 Ship-Address     PIC X(60)
      02 Item Occurs 10 Times
          03 Product-Name   PIC X(32)
          03 Product-ID     PIC 99
          03 Actual-Price   PIC $9(2)v9(2)
          03 Quantity       PIC 9(2)
```

| OrderNumber | SalesRep | CompanyName | OrderDate | ShipAddress | | |
|---|---|---|---|---|---|---|
| 10324 | Dodsworth, Anne | Save-a-Lot Markets | 8-Nov-94 | 187 Suffolk Ln. | | |
| | | OrderID | ActualPrice | Quantity | ListPrice | ProductName | ProductID |
| | | 10324 | $35.10 | 80 | $43.90 | Veggie-spread | 63 |
| | | 10324 | $13.90 | 21 | $17.45 | Pavlova | 16 |
| | | 10324 | $14.40 | 70 | $18.00 | Steeleye Stout | 35 |
| | | 10324 | $9.60 | 30 | $12.00 | Spegesild | 46 |
| | | 10324 | $44.00 | 40 | $55.00 | Raclette Courdavault | 59 |
| OrderNumber | SalesRep | CompanyName | OrderDate | ShipAddress | | |
| 10577 | Dodsworth, Anne | Trail's Head Gourmet Provioners | 24-Jul-95 | 722 DaVinci Blvd | | |
| | | OrderNumber | ActualPrice | Quantity | ListPrice | ProductName | ProductID |
| | | 10577 | $13.00 | 18 | $13.00 | Original Frankfurter grune SoBo | 77 |
| | | 10577 | $7.75 | 20 | $7.75 | Rhonbau Klosterbier | 75 |
| | | 10577 | $18.00 | 10 | $18.00 | Chartreuso Verte | 39 |

FIG. 6B

| OrderID | CustomerID | EmployeeID | OrderDate | ShipVia | ShipAddress | |
|---|---|---|---|---|---|---|
| 10324 | 23456 | 56731 | 8-Nov-94 | 34567 | 187 Suffolk Ln. | |

| OrderID | UnitPrice | Quantity | Discount | ProductName | ProductCode |
|---|---|---|---|---|---|
| 10324 | $35.10 | 80 | 20% | Veggie-spread | 63 |
| 10324 | $13.90 | 21 | 20% | Pavlova | 16 |
| 10324 | $14.40 | 70 | 20% | Steeleye Stout | 35 |
| 10324 | $9.60 | 30 | 20% | Spegesild | 46 |
| 10324 | $44.00 | 40 | 20% | Raclette Courdavault | 59 |

| OrderID | CustomerID | EmployeeID | OrderDate | ShipVia | ShipAddress | |
|---|---|---|---|---|---|---|
| 10577 | 23457 | 56731 | 24-Jul-95 | 34521 | 722 DaVinci Blvd | |

| OrderID | UnitPrice | Quantity | Discount | ProductName | ProductCode |
|---|---|---|---|---|---|
| 10577 | $13.00 | 18 | 0% | Original Frankfurter grune SoBo | 77 |
| 10577 | $7.75 | 20 | 0% | Rhonbau Klosterbier | 75 |
| 10577 | $18.00 | 10 | 0% | Chartreuso Verte | 39 |

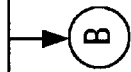

FIG. 6C

| CustomerID | CompanyName | Address | | |
|---|---|---|---|---|
| 23456 | Save-a-lot Markets | 187 Suffolk Ln. | | |

| CustomerID | ContactName | Title | Phone | |
|---|---|---|---|---|
| 23456 | Jose Pavorotti | Sales Representative | (208) 555-8097 | |

| OrderID | CustomerID | EmployeeID | OrderDate | ShipVia | ShipAddress |
|---|---|---|---|---|---|
| 10324 | 23456 | 56731 | 8-Nov-94 | 34567 | 187 Suffolk Ln. |

| OrderID | UnitPrice | Quantity | Discount | ProductName | ProductCode |
|---|---|---|---|---|---|
| 10324 | $35.10 | 80 | 20% | Veggie-spread | 63 |
| 10324 | $13.90 | 21 | 20% | Pavlova | 16 |
| 10324 | $14.40 | 70 | 20% | Steeleye Stout | 35 |
| 10324 | $9.60 | 30 | 20% | Spegesild | 46 |
| 10324 | $44.00 | 40 | 20% | Raclette Courdavault | 59 |

| CustomerID | CompanyName | Address | | |
|---|---|---|---|---|
| 23457 | Trail's Head Gourmet Prov | 722 DaVinci Blvd | | |

| CustomerID | ContactName | Title | Phone | |
|---|---|---|---|---|
| 23457 | Helvetians Nag | Purchasing Mgr. | (206) 555-8257 | |
| 23457 | Joe Little | Product Mgr. | (206) 555-8255 | |

| OrderID | CustomerID | EmployeeID | OrderDate | ShipVia | ShipAddress |
|---|---|---|---|---|---|
| 10577 | 23457 | 56731 | 24-Jul-95 | 34521 | 722 DaVinci Blvd |

| OrderID | UnitPrice | Quantity | Discount | ProductName | ProductCode |
|---|---|---|---|---|---|
| 10577 | $13.00 | 18 | 0% | Original Frankfurter grune SoBe | 77 |
| 10577 | $7.75 | 20 | 0% | Rhonbau Klosterbier | 75 |
| 10577 | $18.00 | 10 | 0% | Chartreuso Verte | 39 |

FIG. 8

| Company Name | Contact Name | Contact Title | Phone | | |
|---|---|---|---|---|---|
| Great Lakes Food Market | Howard Snyd | Marketing Mgr. | (503) 555-7555 | | |

| Order ID | | Contact Title | Order Date | Ship Address | Shipper Name | Shipper Phone |
|---|---|---|---|---|---|---|
| 10589 | Callahan, Laura | Sales Rep. | 04-Aug-95 | 2732 Baker Blvd | United Package | (503)555-3199 |
| 10616 | Davolio, Nancy | | 31-Aug-95 | 2732 Baker Blvd | United Package | (503)555-3199 |
| 10681 | Leverling, Janet | | 26-Oct-95 | 2732 Baker Blvd | Federal Shipping | (503)555-9931 |
| 11040 | Peacock, Marg | | 22-May-96 | 2732 Baker Blvd | Federal Shipping | (503)555-9931 |
| 10656 | Suyama, Mich | | 05-Oct-95 | 2732 Baker Blvd | Speedy Express | (503)555-9831 |

| Company Name | Contact Name | Contact Title | Phone | | |
|---|---|---|---|---|---|
| Hungry Coyote Imports | Yoshi Latimer | Sales Rep. | (503) 555-6874 | | |

| Order ID | | Contact Title | Order Date | Ship Address | Shipper Name | Shipper Phone |
|---|---|---|---|---|---|---|
| 10660 | Callahan, Laura | Sales Rep. | 09-Oct-95 | City Center Plaza | Speedy Express | (503)555-9831 |
| 10394 | Davolio, Nancy | | 25-Jan-95 | City Center Plaza | Federal Shipping | (503)555-9931 |
| 10415 | Leverling, Janet | | 15-Feb-95 | City Center Plaza | Speedy Express | (503)555-9831 |

| Company Name | Contact Name | Contact Title | Phone | | |
|---|---|---|---|---|---|
| Lazy K Kountry Store | John Steel | Marketing Mgr. | (509) 555-7969 | | |

| Order ID | | Contact Title | Order Date | Ship Address | Shipper Name | Shipper Phone |
|---|---|---|---|---|---|---|
| 10545 | Callahan, Laura | Sales Rep. | 22-Jun-95 | 12 Orchestra Ter | United Package | (503)555-3199 |
| 10482 | Davolio, Nancy | | 21-Apr-95 | 12 Orchestra Ter | Federal Shipping | (503)555-9931 |

FIG. 15A

| Company Name | Contact Name | Contact Title | Phone |
|---|---|---|---|
| Let's Stop N Shop | Jaime Yornes | Owner | (415) 555-5938 |

| Order ID | | Contact Title | Order Date | Ship Address | Shipper Name | Shipper Phone |
|---|---|---|---|---|---|---|
| 10719 | Callahan, Laura | Sales Rep. | 27-Nov-95 | 87 Polk St. | United Packager | (503)555-3199 |
| 10579 | Davolio, Nancy | | 26-Jul-95 | 87 Polk St. | United Packager | (503)555-3199 |

| Company Name | Contact Name | Contact Title | Phone |
|---|---|---|---|
| Lonesome Pine Restaurant | Fran Wilson | Sales Manager | (503) 555-9573 |

| Order ID | | | Order Date | Ship Address | Shipper Name | Shipper Phone |
|---|---|---|---|---|---|---|
| 10544 | Peacock, Marg. | Sales Rep. | 21-Jun-95 | 89 Chiaroscuror | Speedy Express | (503)555-9831 |
| 10317 | Suyama, Mich | | 31-Oct-94 | 89 Chiaroscuror | Speedy Express | (503)555-9831 |

FIG. 15B

| Shipper Name | Shipper Phone |
|---|---|
| Federal Shipping | (503)555-9931 |

| Order ID | Sales Rep. | Company Name | Contact Name | Contact Title | Phone | Order Date | Ship Address |
|---|---|---|---|---|---|---|---|
| 10394 | Davolio, N | Hungry Coyote... | Yoshi Latimer | Sales Rep. | (503)555-6874 | 25-Jan-95 | City Centre Plaz... |
| 10482 | Davolio, N | Lazy K Kountry... | John Steel | Marketing Mgr. | (509)555-7969 | 21-Apr-95 | 12 Orchestra Te... |
| 10681 | Leverling, J | Great Lakes... | Howard Snyder | Marketing Mgr. | (503)555-7555 | 26-Oct-95 | 2732 Baker Blvd... |
| 11040 | Peacock, M | Great Lakes... | Howard Snyder | Marketing Mgr. | (503)555-7555 | 22-May-96 | 2732 Baker Blvd... |

| Shipper Name | Shipper Phone |
|---|---|
| Speedy Express | (503)555-9831 |

| Order ID | Sales Rep. | Company Name | Contact Name | Contact Title | Phone | Order Date | Ship Address |
|---|---|---|---|---|---|---|---|
| 10660 | Callahan, L | Hungry Coyote... | Yoshi Latimer | Sales Rep. | (503)555-6874 | 09-Oct-95 | City Centre Plaz... |
| 10415 | Leverling, J | Hungry Coyote... | Yoshi Latimer | Sales Rep. | (503)555-6874 | 15-Feb-95 | City Centre Plaz... |
| 10544 | Peacock, M | Lonesome Pine... | Fran Wilson | Sales Mgr. | (503)555-9573 | 21-Jun-95 | 89 Chiaroscuro... |
| 10656 | Suyama, M | Great Lakes... | Howard Synder | Marketing Mgr. | (503)555-7555 | 05-Oct-95 | 2732 Baker Blvd... |
| 10317 | Suyama, M | Lonesome Pine... | Fran Wilson | Sales Mgr. | (503)555-9573 | 31-Oct-94 | 89 Chiaroscuro... |

| Shipper Name | Shipper Phone |
|---|---|
| United Package | (503)555-3199 |

| Order ID | Sales Rep. | Company Name | Contact Name | Contact Title | Phone | Order Date | Ship Address |
|---|---|---|---|---|---|---|---|
| 10589 | Callahan, L | Great Lakes... | Howard Snyder | Marketing Mgr. | (503)555-7555 | 04-Aug-95 | 2732 Baker Blvd... |
| 10545 | Callahan, L | Lazy K Kountry... | John Steel | Marketing Mgr. | (503)555-7969 | 22-Jun-95 | 12 Orchestra Te... |
| 10719 | Callahan, L | Lets Stop N... | Jaime Yorres | Owner | (415)555-5938 | 27-Nov-95 | 87 Polk St. Suite 5 |
| 10616 | Davolio, N | Great Lakes... | Howard Snyder | Marketing Mgr. | (503)555-7555 | 31-Aug-95 | 2732 Baker Blv... |
| 10579 | Davolio, N | Lets Stop N... | Jaime Yorres | Owner | (415)555-5938 | 26-Jul-95 | 87 Polk St. Suite 5 |

FIG. 16

| Sales Rep. Callahan, Laura | | | | | | | | |
|---|---|---|---|---|---|---|---|---|
| Order ID | Company Name | Contact Name | Contact Title | Phone | Order Date | Ship Address | Shipper Name | Shipper Phone |
| 10660 | Hungry Coyote.... | Yoshi Latimer | Sales Rep. | (503)555-6874 | 09-Oct-95 | City Centre Plaza | Speedy Express | (503)555-9831 |
| 10589 | Great Lakes Food... | Howard Snyder | Marketing Mgr. | (503)555-7555 | 04-Aug-95 | 2732 Baker Blvd | United Package | (503)555-3199 |
| 10545 | Lazy K Kountry Store | John Steel | Marketing Mgr. | (503)555-7969 | 22-Jun-95 | 12 Orchestra Ter | United Package | (503)555-3199 |
| 10719 | Let's Stop N Shop | Jamie Yorres | Owner | (415)555-5938 | 27-Nov-95 | 87 Polk St. Suite5 | United Package | (503)555-3199 |

| Sales Rep. Davolio, Nancy | | | | | | | | |
|---|---|---|---|---|---|---|---|---|
| Order ID | Company Name | Contact Name | Contact Title | Phone | Order Date | Ship Address | Shipper Name | Shipper Phone |
| 10394 | Hungry Coyote.... | Yoshi Latimer | Sales Rep. | (503)555-6874 | 25-Jan-95 | City Centre Plaza | Federal Shipping | (503)555-9931 |
| 10482 | Lazy K Kountry Store | John Steel | Marketing Mgr. | (503)555-7969 | 21-Apr-95 | 12 Orchestra Ter | Federal Shipping | (503)555-9931 |
| 10616 | Great Lakes Food... | Howard Snyder | Marketing Mgr. | (503)555-7555 | 31-Aug-95 | 2732 Baker Blvd | United Package | (503)555-3199 |
| 10579 | Let's Stop N Shop | Jamie Yorres | Owner | (415)555-5938 | 26-Jul-95 | 87 Polk St. Suite5 | United Package | (503)555-3199 |

| Sales Rep. Leverling, Janet | | | | | | | | |
|---|---|---|---|---|---|---|---|---|
| Order ID | Company Name | Contact Name | Contact Title | Phone | Order Date | Ship Address | Shipper Name | Shipper Phone |
| 10681 | Great Lakes Food... | Howard Snyder | Marketing Mgr. | (503)555-7555 | 26-Oct-95 | 2732 Baker Blvd | Federal Shipping | (503)555-9931 |
| 10415 | Hungry Coyote.... | Yoshi Latimer | Sales Rep. | (503)555-6874 | 15-Feb-95 | City Centre Plaza | Speedy Express | (503)555-9831 |

FIG. 17A

| Sales Rep. Peacock, Margaret | | | | | | | | |
|---|---|---|---|---|---|---|---|---|
| Order ID | Company Name | Contact Name | Contact Title | Phone | Order Date | Ship Address | Shipper Name | Shipper Phone |
| 11040 | Great Lakes Food... | Howard Snyder | Marketing Mgr. | (503)555-7555 | 22-May-95 | 2732 Baker Blvd | Federal Shipping | (503)555-9931 |
| 10544 | Lonesome Pine... | Fran Wilson | Sales Mgr. | (503)555-9573 | 21-Jun-95 | 89 Chiaroscuro... | Speedy Express | (503)555-9831 |

| Sales Rep. Suyama, Michael | | | | | | | | |
|---|---|---|---|---|---|---|---|---|
| Order ID | Company Name | Contact Name | Contact Title | Phone | Order Date | Ship Address | Shipper Name | Shipper Phone |
| 10656 | Great Lakes Food... | Howard Snyder | Marketing Mgr. | (503)555-7555 | 05-Oct-95 | 2732 Baker Blvd | Speedy Express | (503)555-9831 |
| 10317 | Lonesome Pine... | Fran Wilson | Sales Mgr. | (503)555-9573 | 31-Oct-94 | 89 Chiaroscuro... | Speedy Express | (503)555-9831 |

FIG. 17B and APPARATUS FOR
PIPELINING THE TRANSFORMATION OF
INFORMATION BETWEEN
HETEROGENEOUS SETS OF DATA
SOURCES

BACKGROUND OF THE INVENTION

1. Technical Field

The invention relates to data processing. More particularly, the invention relates to a method and apparatus for pipelining the transformation of information between heterogeneous sets of data sources.

2. Description of the Prior Art

Enterprise application integration is a new market focused on the exchange of data between legacy and packaged applications. The traditional way of building interfaces between applications has been to extract data from the source application, stage it in some mass storage, then transform it according to some transformation rule, stage the transformed data in mass storage and deliver it to the target application. There are three problems with this source-oriented approach:

The amount of mass storage necessary to stage the data;

The overhead in reading and writing the data to mass storage multiple times; and The serial execution of the extraction, transformation, and delivery does not take advantage of multiprocessor technology.

Staging is necessary because the target data are often the result of transforming individual data attributes that are scattered all over the source. It would be advantageous to provide a method and apparatus that addresses the problems attendant with the transformation of information between heterogeneous sets of data sources.

SUMMARY OF THE INVENTION

The invention provides a method and apparatus for pipelining the transformation of information between heterogeneous sets of data sources. The invention avoids intermediate data staging by constructing metadata that allow the acquisition of data in an order that matches the order in which the target data must be delivered.

In a further feature of the invention, the acquisition, transformation, and delivery stages of an interface between two applications are pipelined as three processes that execute simultaneously on a continuous flow of data.

Pipelining is a well-known technology that has been in use in operating systems, such as UNIX pipes and more recently by Torrent systems, to optimize the usage of multiprocessor machines. The invention applies pipelining technology to data transformation between heterogeneous data sources.

BRIEF DESCRIPTION OF THE DRAWINGS

FIGS. 6A–6C illustrate a block schematic diagram showing the gathering of input attributes and the construction of a hierarchy of target entities according to the invention;

FIG. 8 is a table showing the flow of records being delivered to a target according to the invention;

FIGS. 15A–15B illustrate a record flow optimized for delivering a Customers/Orders hierarchy according to the invention;

FIG. 16 is a record flow optimized for delivering a Shippers/Orders hierarchy according to the invention; and FIGS. 17A–17B illustrate a record flow optimized for delivering a Employees/Orders hierarchy according to the invention.

DETAILED DESCRIPTION OF THE INVENTION

Building an interface between heterogeneous data sources (e.g. files, databases, and applications) generally consists of the acquisition of the data from the source, the transformation of the data into the structure and formats understood by the target, and the delivery of the data to the target.

The distribution of the processing time between acquisition, transformation, and delivery is highly dependent on the difference between the structure of the source data and the structure of the target data. In many business situations the optimization of the overall interface is essential, so that it can run within the narrow time frames required by business. Examples include: overnight loading of a data warehouse, and near-zero latency in transforming messages between front office and back office.

Paralleling as much of the processing as possible can optimize the interface.

Two approaches can be considered:

Partitioning the data that need to be transformed and transforming all the partitions in parallel threads.

Figure 1:
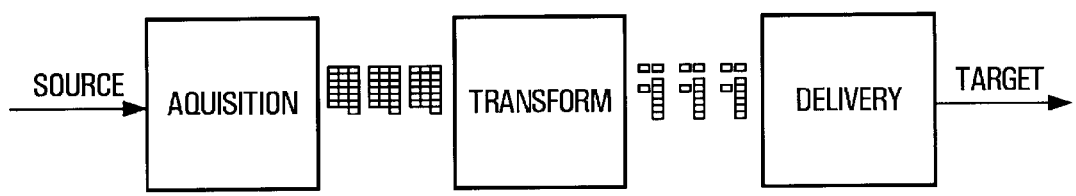
FIG. 1 is a block schematic diagram showing the pipelining of data acquisition, transformation, and delivery according to the invention.

Simultaneously running the acquisition, transformation, and delivery as three parallel threads connected by a pipeline (see FIG. 1).

The presently preferred embodiment of the invention is concerned with the second method. The first method, partitioning, can be handled independently and superimposed upon pipelining.

Delivery of data is often subject to referential integrity constraints where child entities cannot exist without their parent entities. For instance, an order item cannot exist without an order entity. The physical representation of referential integrity constraints depends on the type of data source. In a relational database management system (DBMS), an explicit constraint may exist that precludes the insertion of the child row before the parent row has been inserted. In a COBOL described file, an explicit constraint usually corresponds to the physical placement of the parent record before the child record in the file. In all cases referential integrity implies that a parent must be delivered before its children.

This delivery constraint, together with pipelining, requires that a parent be transformed before its children. Otherwise all children would have to be buffered before delivery can proceed, thereby breaking the pipeline between transformation and delivery.

The transformation constraint and pipelining require that all the source entities and attributes necessary for transform to produce a target parent must be acquired before the data needed to build the children. Otherwise, all children-related data would have to be buffered before transform can proceed, thereby breaking the pipeline between acquisition and transform.

The above constraint can be summarized as follows: the source entities and attributes necessary to construct a hierarchy must be acquired in the order that the records are delivered, in accordance with the target referential integrity constraints.

General Data Structures

Figure 2:
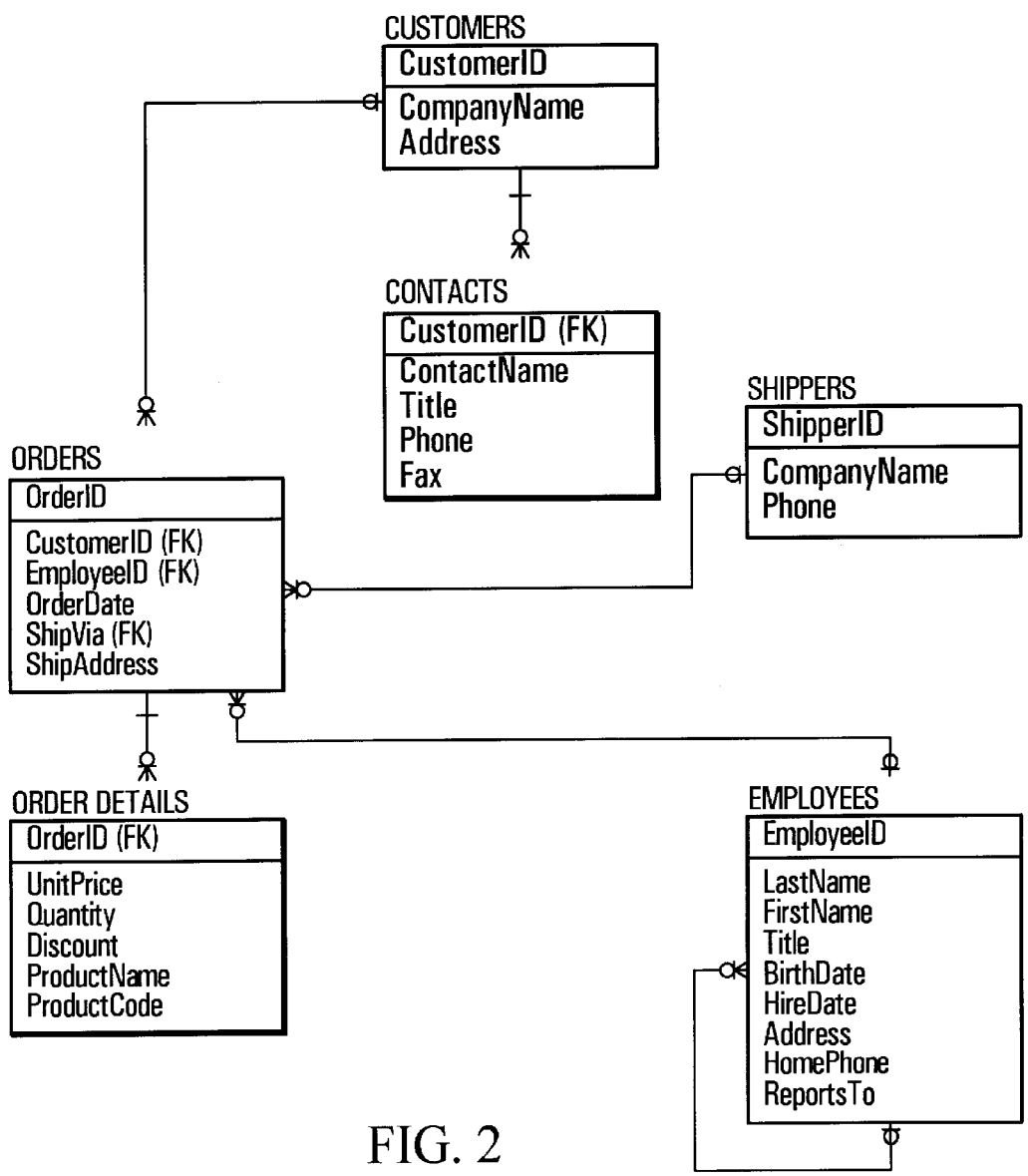
FIG. 2 is a block schematic diagram showing examples of data structures.

Data structures can be reduced to three basic types (see FIG. 2):

Hierarchies

In a hierarchical data structure, each entity has no more than one parent. There may be many levels in the hierarchy. Customers-Orders-Order Details is a three level hierarchy. Each entity may have more than one child entity. All records of all the children entities must be delivered after the parent.

Networks

In a networked data structure, at least one entity has more than one parent. Each Orders record has three parents Customers, Shippers, Employees. If there is referential integrity constraints on all three hierarchies all three of its parents must be delivered before an Orders record.

Recursive

In a recursive data structure, an entity is its own parent. This is a special case of a multilevel hierarchy. For instance, Employees reporting to Employees is a recursive hierarchy where the ReportsTo foreign key matches the EmployeeID primary key. At least one of the records must be the root of the tree. This is often represented by a NULL ReportsTo Foreign Key. A recursive structure must be constructed by first delivering the Employees record is the root of the tree, then delivering all Employee records with foreign keys matching the primary key of the first record, and so on recursively.

Hierarchy Implementation

There are three ways that a target hierarchy (FIG. 3) can be represented in a data source:

An attribute of a parent entity (primary key) is used to identify all children entities that have an attribute (foreign key) with matching values. The following example represents a hierarchy as two tables in a relational database where OrderID is a primary key in the parent Orders table that matches a foreign key OrderID in the child Item table. The Entity/Relationship diagram shown in FIG. 3 symbolizes the hierarchy of tables and the following sample shows some rows of each table.

Orders Table:

| Order ID | Sales Rep | Company Name | Contact Name | Contact Title | Phone | Order Date | Ship Address |
|---|---|---|---|---|---|---|---|
| 10577 | Dodsworth, Anne | Trail's Head Gourmet Provisioners | Helvetius Nagy | Sales Associate | (206) 555-8257 | 24-Jul-95 | 722 DaVinci Blvd. |
| 10324 | Dodsworth, Anne | Save-a-lot Markets | Jose Pavarotti | Sales Representative | (208) 555-8097 | 8-Nov-94 | 187 Suffolk Ln. |

Item table:

| Order D | Product Name | Product D | Actual Price | Quantity |
|---|---|---|---|---|
| 10577 | Vegie-spread | 63 | $35.10 | 80 |
| 10577 | Pavlova | 16 | $13.90 | 21 |
| 10577 | Steeleye Stout | 35 | $14.40 | 70 |
| 10324 | Vegie-spread | 63 | $35.10 | 80 |
| 10324 | Pavlova | 16 | $13.90 | 21 |

All child records are placed next to their parent record (usually following the parent) in a structured file. The COBOL declaration in FIG. 4 describes a file containing the same hierarchical structure as before. A sample of instance data shows that the associated Item records immediately follow each Order record (the shaded header description has been added to help comprehension but is not included in the actual data).

| Order ID | Sales Rep | Company Name | Contact Name | Contact Title | Phone | Order Date | Ship Address | Product Name | Product ID | Actual Price | Quantity |
|---|---|---|---|---|---|---|---|---|---|---|---|
| 10577 | Dodsworth, Anne | Trail's Head Gourmet Provisioners | Helvetius Nagy | Sales Associate | (208) 555-8257 | 24-Jul-95 | 722 DaVinci Blvd. | Vegie-spread | 63 | $35.10 | 80 |
|  |  |  |  |  |  |  |  | Pavlova | 16 | $13.90 | 21 |
|  |  |  |  |  |  |  |  | Steeleye | 35 | $14.40 | 70 |

-continued

| Order ID | Sales Rep | Company Name | Contact Name | Contact Title | Phone | Order Date | Ship Address | Product Name | Product ID | Actual Price | Quantity |
|---|---|---|---|---|---|---|---|---|---|---|---|
| 10324 | Dodsworth, Anne | Save-a-lot Markets | Jose Pavarotti | Sales Representative | (208) 555-8097 | 08-Nov-94 | 187 Suffolk Ln. | Stout Vegie-spread | 63 | $35.10 | 80 |
|  |  |  |  |  |  |  |  | Pavlova | 16 | $13.90 | 21 |

The hierarchy is denormalized, that is, each child record contains all the attributes of the parent. The Order and item tables/records can be combined into one table as follows:

How data are delivered without breaking the pipeline

| Order ID | Sales Rep | Company Name | Contact Name | Contact Title | Phone | Order Date | Ship Address | Product Name | Product ID | Actual Price | Quantity |
|---|---|---|---|---|---|---|---|---|---|---|---|
| 10577 | Dodsworth, Anne | Trail's Head Gourmet Provisioners | Helvetius Nagy | Sales Associate | (206) 555-8257 | 24-Jul-95 | 722 DaVinci Blvd. | Vegie-spread | 63 | $35.10 | 80 |
| 10577 | Dodsworth Anne | Trail's Head Gourmet Provisioners | Helvetius Nagy | Sales Associate | (206) 555-8257 | 24-Jul-95 | 722 DaVinci Blvd. | Pavlova | 16 | $13.90 | 21 |
| 10577 | Dodsworth Anne | Trail's Head Gourmet Provisioners | Helvetius Nagy | Sales Associate | (206) 555-8257 | 24-Jul-95 | 722 DaVinci Blvd. | Steeleye Stout | 35 | $14.40 | 70 |
| 10324 | Dodsworth, Anne | Save-a-lot Markets | Jose Pavarotti | Sales Representative | (208) 555-8097 | 8-Nov-94 | 187 Suffolk Ln. | Vegie-spread | 63 | $35.10 | 80 |
| 10324 | Dodsworth, Anne | Save-a-lot Markets | Jose Pavarotti | Sales Representative | (208) 555-8097 | 8-Nov-94 | 187 Suffolk Ln. | Pavlova | 16 | $13.90 | 21 |

When the target hierarchy is implemented as tables, the referential integrity constraints can be enforced by either:
  First delivering all the Orders records, followed by the delivery of all the Item records; or
  Delivering each Orders record, followed by all its child Item records.

Although both methods meet the referential integrity constraints, the second one is often preferable because one Order and its related Items must be committed together for reason of business semantics.

When the target hierarchy is implemented as a structured file, the records must be delivered sequentially. Otherwise extensive caching may be required, thereby breaking the pipeline. Therefore all children Item records must immediately follow each Orders record.

When the target hierarchy is denormalized, the parent Orders record must be at hand when each of its child Item record is delivered so that the attribute of the parent can be combined with the attributes of the child. To avoid excessive caching, it is desirable that all its child Item records follow each Orders record.

In conclusion, the delivery of data to permanent storage to construct a hierarchy of records, such as the Orders/Item hierarchy, should be done by delivering each parent record followed by all its children. This eliminates caching requirements and allows commitment to persistent storage of logical groups of parent/children records together.

How Data Are Transformed Without Breaking the Pipeline

Each target record is the result of transforming the attributes of one or several source records via a transformation unit referred to herein as a Mapping Module.

In pipelining, the source record attributes needed to build a target record must be available all at once. Otherwise extensive caching would be required, thereby breaking the pipeline. In other words, a Source View must join source records and pipe to the Mapping Module the records containing all the attributes necessary to construct a target record.

Figure 5:
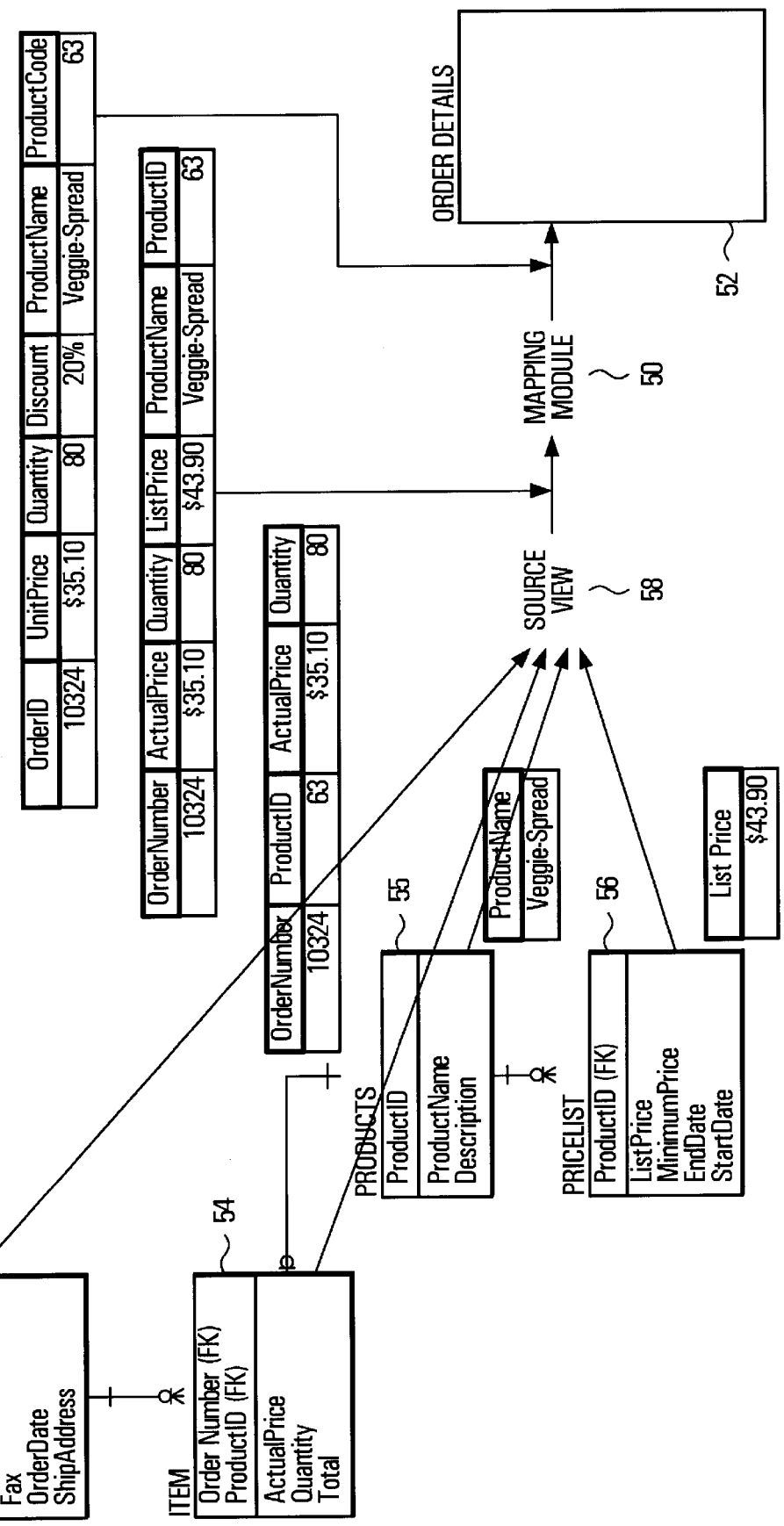
FIG. 5 is a block schematic diagram showing the gathering of all input attributes and construction of a target entity according to the invention.

In FIG. 5, a Mapping Module 50 constructs a record of the Order Details table 52 from attributes of four source entities: Orders 53, Item 54, Products 55, and Price List 56. The Source View 58 gathers the attributes that the Mapping Module needs to construct the target record. If the source is relational, the source view is equivalent to executing the following SQL statement:

Select OrderNumber, ActualPrice, Quantity, ListPrice, ProductName, ProductID From Orders, Item, Products, PriceList
  Where Orders.OrderNumber=Item.OrderNumber and
  Item.ProductID=Products.ProductID and
  Products.ProductID=PriceList.ProductID and
  OrderDate between StartDate and EndDate The Mapping Module computes Discount from the List Price in the Pricelist source entity and the Actual Price in the Item source entity. The OrderDate in the Orders Source entity determines the relevant list price.

Discount=(List Price−Actual Price)/List Price

How Data Are Transformed to Ensure that all Children (Item) Follow Their Parent (Orders) at Delivery Time To construct an Orders record followed by all its child Item records, the Mapping Modules constructing these target records and the Source Views feeding these Mapping Modules must be executed in an order that matches the parent/child hierarchy. In other words, the Source View gathering the data to construct an Orders record must be followed by a Source View that gathers the data to construct all the child Item records. This mechanism of building a stream of source records that matches the hierarchy of the target is called composition. This composition is possible because there is a hierarchy of Source Views and Mapping Modules that matches the target hierarchy.

Figure 6A:
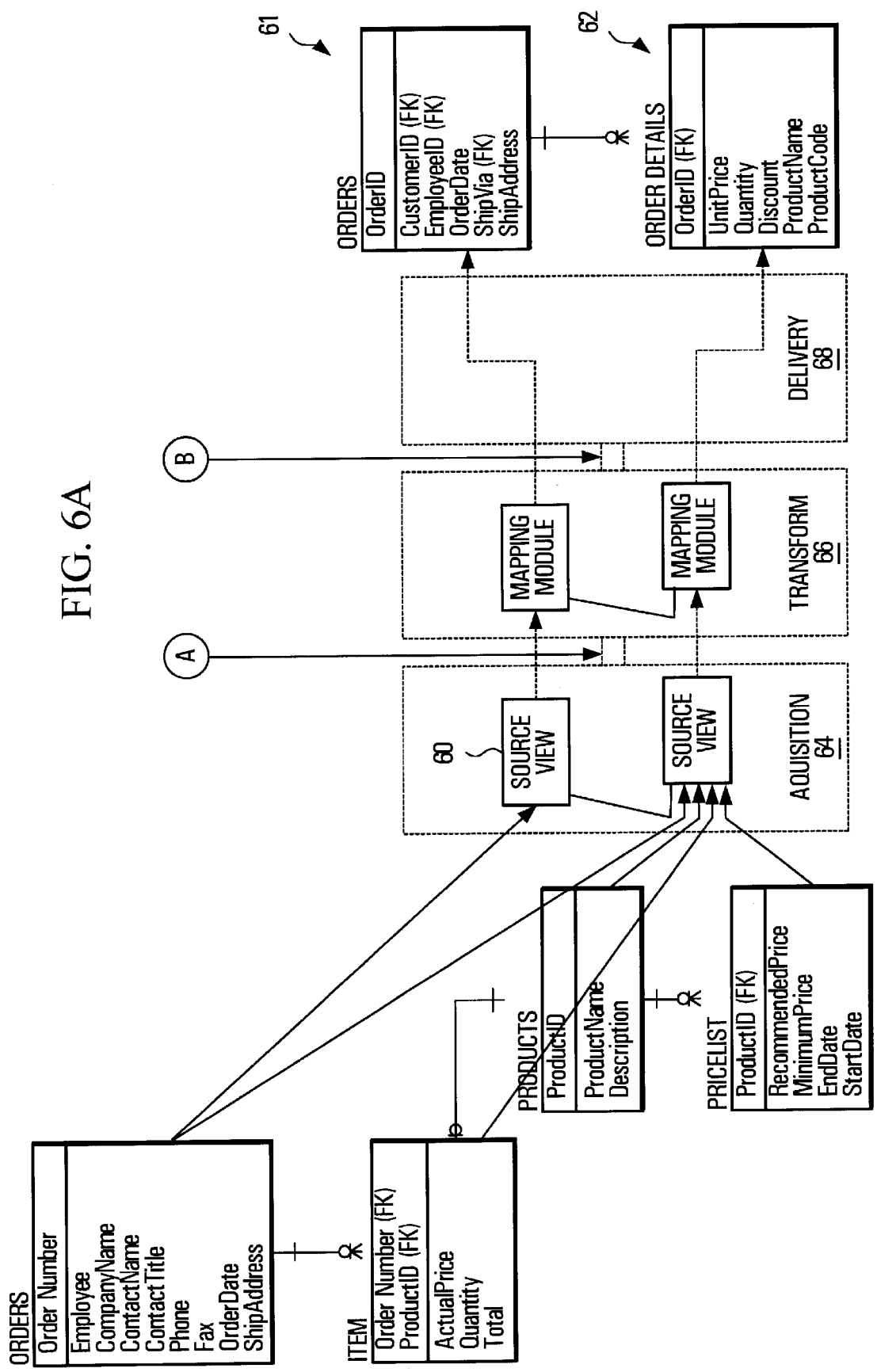

In FIGS. 6A–6C, the hierarchy of Source Views 60 gathers the source attributes that Transform needs to construct an Orders record 61 followed by all the child Order Details records 62. Pipelining is maintained between Acquisition 64, Transform 66, and Delivery 68 because all records flow in the order they are processed by each stage of the pipeline.

How Data Are Extracted to Compose a Hierarchy

The source attributes that must be gathered to compose a hierarchy may be represented in either tables, structured files, denormalized tables or files, or a combination thereof.

Figures 3, 4:
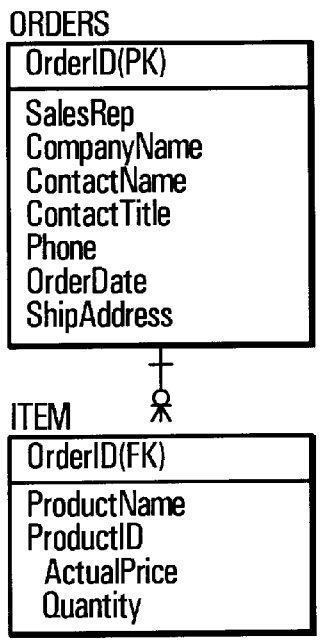
FIG. 3 is a block schematic diagram showing a model of a hierarchy.
FIG. 4 is a table showing a COBOL hierarchy.

If the source is in table format (for instance, some of the source attributes for the target Orders/OrdersDetails hierarchy come from the Orders/Item source table hierarchy in FIG. 3), the composition hierarchy matches the foreign key/primary key relationship. Composition consists of a nested set of queries (SELECT); for each parent row that is extracted (Orders), all the child rows with matching foreign key (Order Number) are extracted.

If the source is a structured file (for instance if the Orders/Item is a COBOL described file as described in FIG. 4), the composition hierarchy matches the Occurs COBOL clause. The composition consists of reading the input file sequentially, skipping the records and attributes that are not needed.

If the source is a denormalized file or table (for instance, if the Orders/Item is the denormalized table described previously), the composition hierarchy corresponds to a relationship that is linked to the denormalized attributes (OrderID, SalesRep, CompanyName, ContactName, Contact Title, Phone, OrderDate, ShipAddress). The composition consists of sorting the input on the denormalized attributes to construct the parent Orders record.

In all cases there is a relationship between entities in the source that is used to compose the hierarchy of source views. The relationship may be:

Inherent to the structure of the source, such as foreign key/primary key in a relational database;

Implicit in several data sources, such as key relationship between entities in different files or databases;

Implied by the physical structure of data in the source, such as an occurs clause in COBOL; or Implied in the denormalized attributes of an entity.

Figure 7:
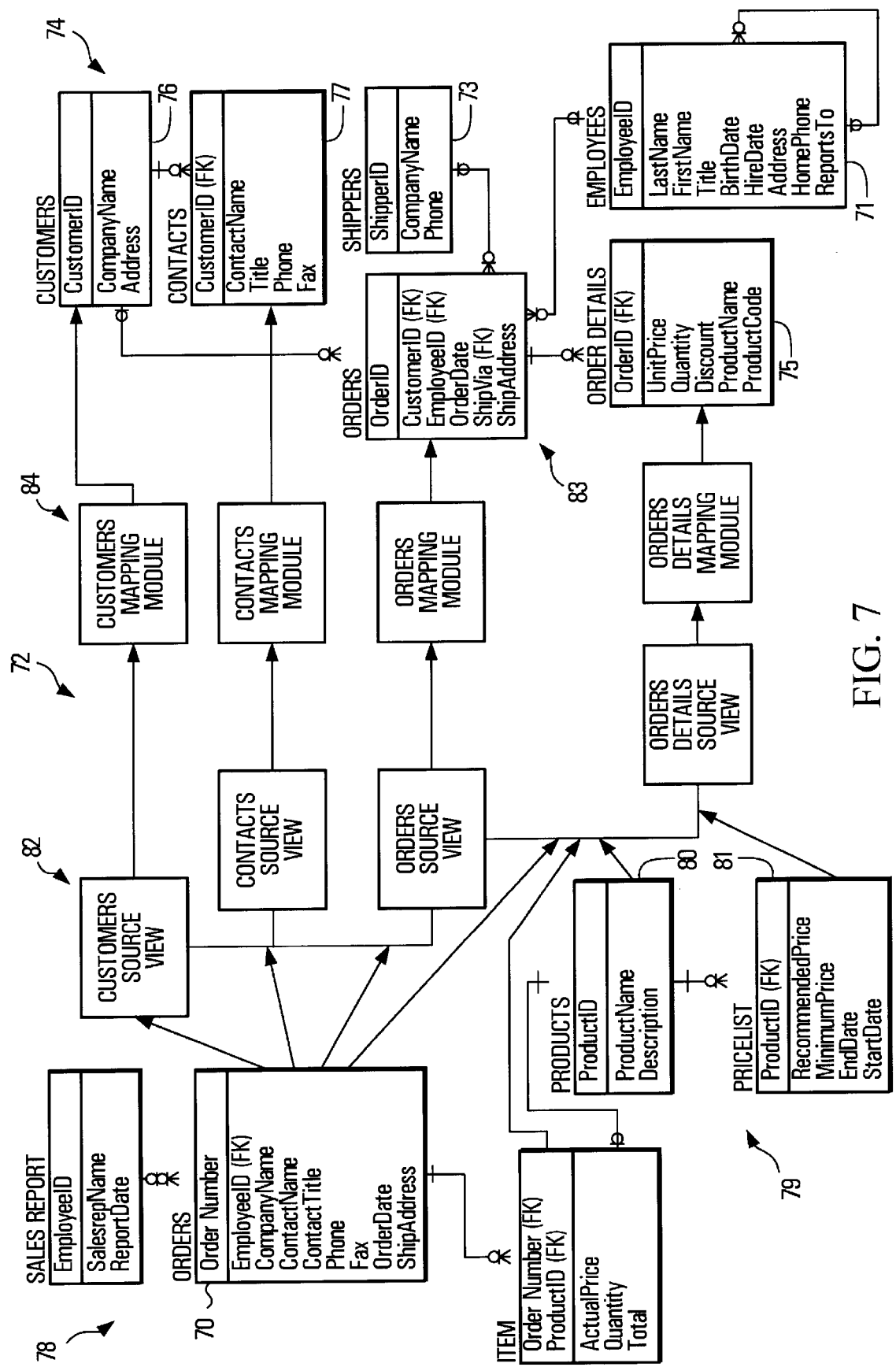
FIG. 7 is a block schematic diagram showing the acquiring, transforming, and delivering of sales records to an order processing database according to the invention.

In practice, the data source is often a combination of all three hierarchical representations. In FIG. 7, a set of sales representative book of orders is transformed into an Order Processing database 74. The database already contains Employees 71 and Shippers 73 tables. New orders are entered in the Orders 70 and Order Details 75 tables; new customers 76 and new customer contacts 77 are entered in the corresponding tables as necessary.

The Sales Report/Orders/Item source hierarchy 78 is a set of Purchase Order forms that are filled by each sales representative in the form of a workbook of spreadsheets. There is one workbook per sales rep, each workbook contains one spreadsheet per order, and each spreadsheet contains one line per item. The Products/Pricelist hierarchy 79 is in a Relational Database with two tables 80, 81. The target database 74 is a highly normalized relational database used for order processing. The Hierarchy of source views 82 matches the two target hierarchies Customers/Contacts 74 and Customers/Orders/OrdersDetails 83. The Source Views 82 gather source attributes for the Mapping Modules 84 that pipe into delivery a stream of records that can be delivered without unnecessary staging (see FIG. 8).

Metadata Necessary to Implement the Hierarchy Pipeline

Figure 9:
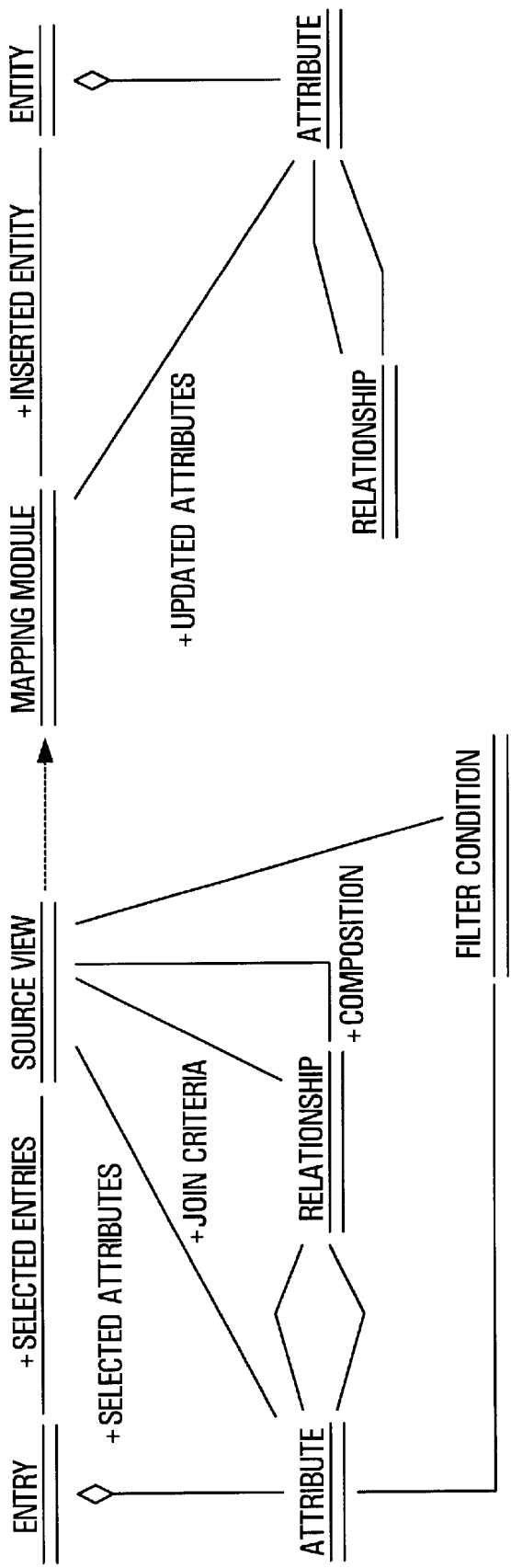
FIG. 9 is a schematic diagram showing class metadata according to the invention.
Figure 10:
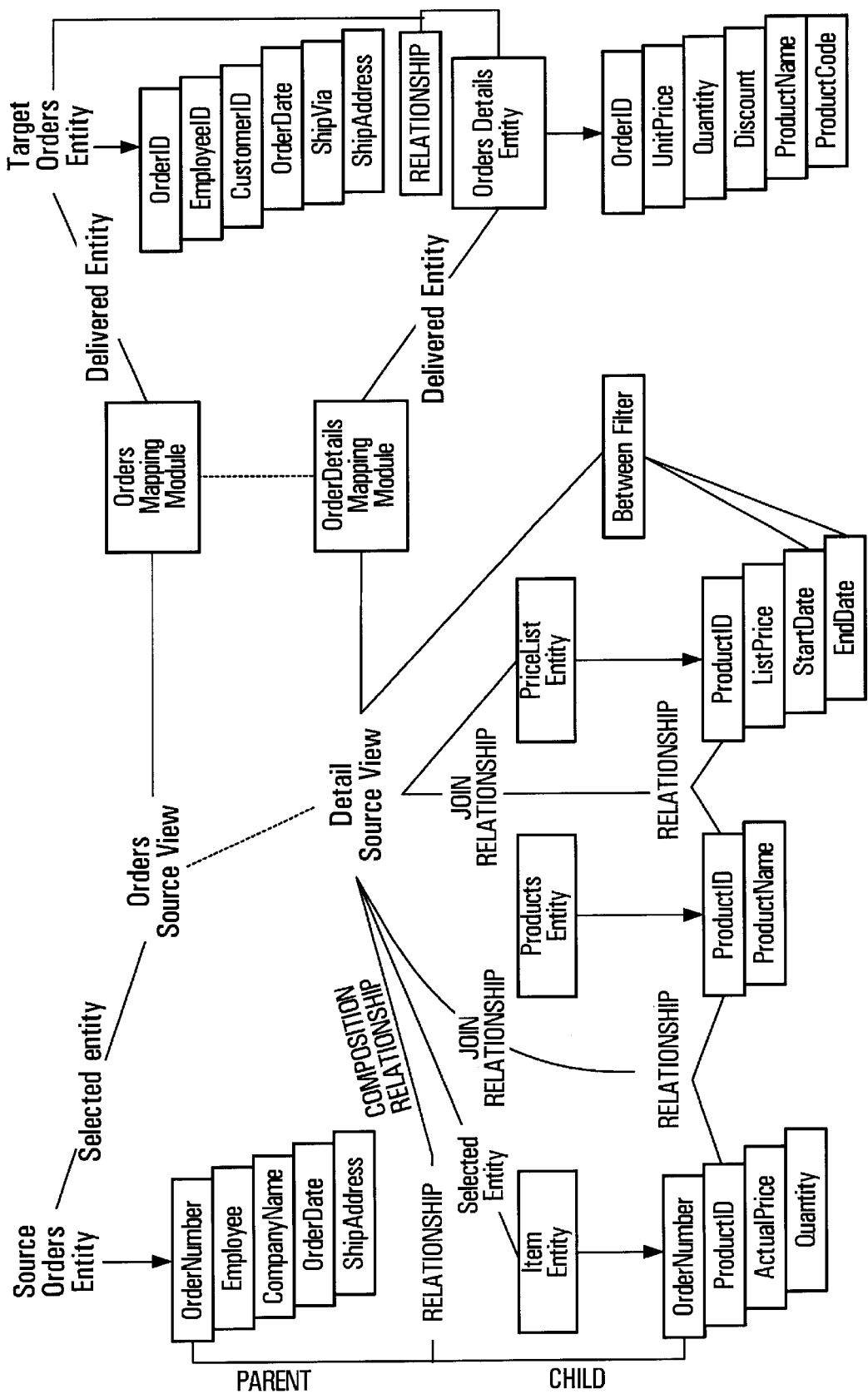
FIG. 10 is a block schematic diagram showing instance metadata according to the invention.

The data structures necessary to acquire, transform, and deliver data in the right order without breaking the pipeline are called metadata. FIG. 9 and FIG. 10 describe the instance and class metadata for the system of FIGS. 6A–6C.

Each Source View Identifies

The source entities and attributes that are selected.

The relationships that are used to join source entities to gather all the attributes necessary for the corresponding mapping module.

The filters that select the subset of the joined entities of relevance to the Mapping Module.

The composition relationship in the source data that matches the hierarchy of source views.

Each Mapping Module constructs a target entity from the attributes gathered by the associated Source View. The relationship between the target entities (Orders and OrderDetails) is used by delivery to enforce referential integrity on the target, thereby ensuring that no OrderDetails record can exist without a matching Orders record.

Network Structures

The pipelining of records in the order that they are delivered into a hierarchy does not apply when an entity is a child in multiple hierarchies. For instance, in the FIG. 8 example, if the employees and Shippers entities did not pre-exist but had to be built from the Source, the flow of records to build each hierarchy would be different, as shown in FIGS. 15A–15B, 16 and 17A–17B. The definition of the records and their order is different. Even if the records were joined so that they would be the same in all three cases, the different order requirement would make it impossible to have a single data flow that is optimized for all three hierarchies.

Figure 11:
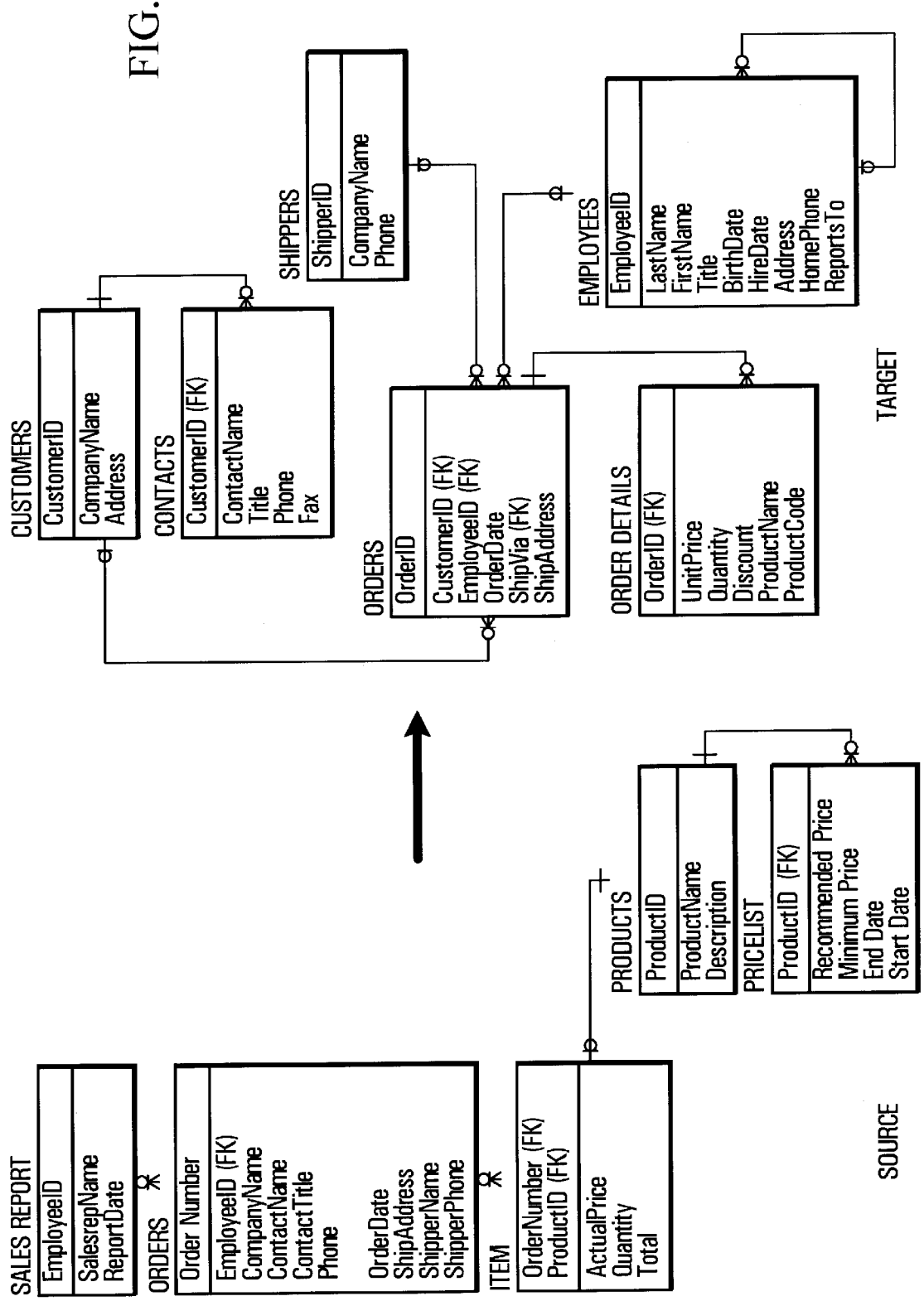
FIG. 11 is a block schematic diagram showing a transformation producing a network structure according to the invention.
Figure 12:
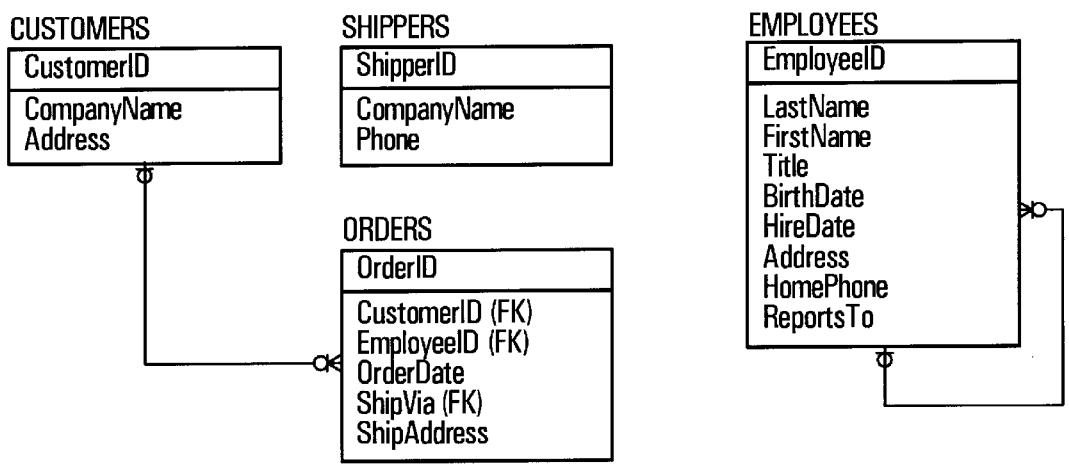
FIG. 12 is a block schematic diagram showing a first hierarchy for implementing the network structure of FIG. 11.
Figure 13:
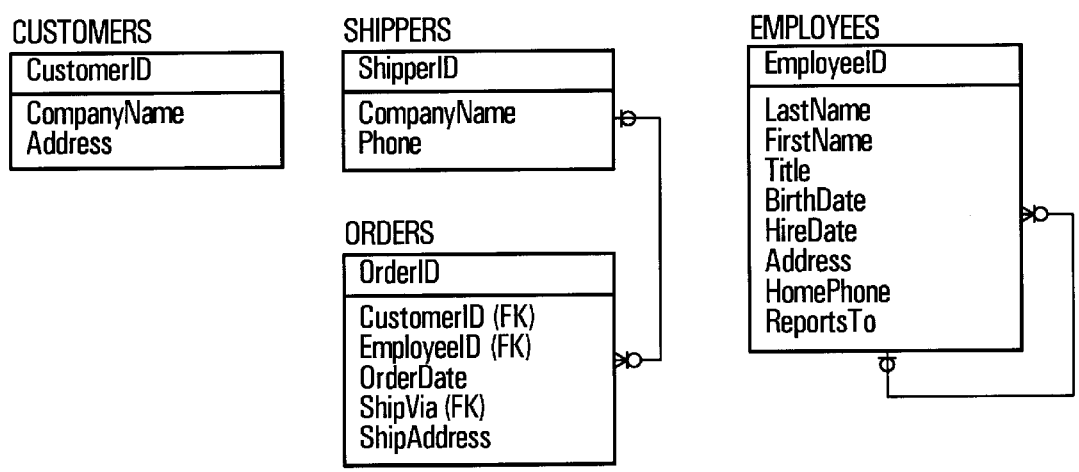
FIG. 13 is a block schematic diagram showing a second hierarchy for implementing the network structure of FIG. 11.
Figure 14:
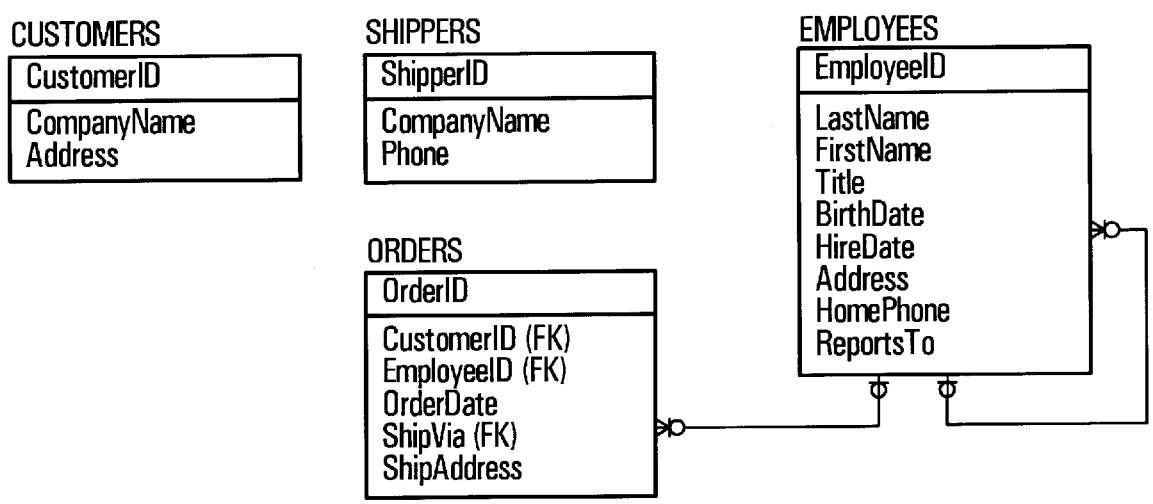
FIG. 14 is a block schematic diagram showing a third hierarchy for implementing the network structure of FIG. 11.

To ensure that the referential integrity constraints are met, the network can be decomposed into three hierarchies and each hierarchy can be delivered separately. The hierarchies in FIGS. 12 to 14 can be considered to implement the transformation of FIG. 11.

The choice between the three alternatives depends mostly on the structure and commitment requirements of the target.

When a parent and its children have to be delivered together as a logical unit of work—either because they must be committed together (Orders and Orders Details) or because the physical structure of the target requires it (sequential file), the other parent entities can be delivered separately beforehand. In the example, there is no clear choice because Customers, Shippers, or Employees can be committed independently and are all tables and can therefore be delivered independently.

Another consideration is the structure of the source. If the physical structure of the source physically matches the target hierarchy (nested records in a COBOL file), it is more efficient to preserve the structure of the source than to perform multiple passes on the input. Again, in the example the source is denormalized, therefore it does not apply.

Another consideration is the whether the source is already sorted on one of the hierarchies. In the example the source is naturally sorted by Sales Rep since there is one book of Orders by Sales Rep (FIGS. 17A–17B). It is therefore more efficient to preserve the Employees/Orders hierarchy in Option 3 (see FIG. 14).

Some hierarchies do not have referential integrity. For instance, Customers/Orders hierarchy clearly does have referential integrity, because there cannot be an order without a Customer. But there could be an order without shipper, therefore the Shippers/Orders hierarchy is not a candidate.

Mechanism

1. Subdivide the target into candidate hierarchies.

2. For each target entity, build the transformation rules to construct the target from the source (Mapping Module).

3. Identify the source entities and attributes that each Mapping Module requires (Source Views).

4. Identify the hierarchies of Source Views that matches the hierarchies of Target entities.

5. Identify the hierarchies in the source that match the Source View hierarchies.

6. Construct metadata describing the structure of the source entities, attributes, and relationships, the hierarchies of source views, the mapping modules, the structure of the target entities, attributes, and relationship.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A method for reducing processing time between acquisition, transformation, and delivery of data during the transformation of information between heterogeneous sets of data sources, comprising the steps of:

subdividing a target into candidate hierarchies;

for each target attribute, building transformation rules with a mapping module to construct a target from a source;

identifying with a source view, source entities and attributes required by said mapping module;

identifying source view hierarchies that match target hierarchies;

identifying source hierarchies that match source view hierarchies; and constructing metadata describing the structure of said source entities, attributes, and relationships, hierarchies of said source view, said mapping module, the structure of said target entities, attributes, and relationships.

2. A method for creating metadata to facilitate the transformation and exchange of data between heterogeneous data sources comprising the steps of:

creating metadata that defines one or more delivery hierarchical data structures and includes delivery order information such that data organized according to the one or more delivery hierarchical data structures when delivered to the target data source in the delivery order meet the referential integrity constraints of the target data source;

creating metadata that defines the transformations required to construct data organized according to each of the one or more delivery hierarchical data structures from source data elements including transformation order information that results in source data elements being transformed into data organized according to the one or more delivery hierarchical data structures in the delivery order; and creating metadata that defines one or more acquisition data structures and includes acquisition order information such that data organized according to the one or more acquisition data structures contains all of the source data elements required to create data organized according to the one or more delivery hierarchical data structures and data organized according to the one or more acquisition data structures acquired from the source data source in the acquisition order can be transformed in the transformation order.

3. The method of claim 2 wherein the one or more delivery hierarchical data structures represent a decomposition of a network data structure defining the target data source.

4. The method of claim 2 wherein the source data source is in table format and the acquisition order matches the foreign key/primary key relationship.

5. The method of claim 2 wherein the source data source is a structured file and the acquisition order matches the order of data in the structured file.

6. The method of claim 2 wherein the source data is a denormalized file or table and the acquisition order corresponds to a relationship that is linked to the denormalized attributes.

7. The method of claim 2 wherein the source data source is a combination of zero or more table format data sources, zero or more structured files and zero or more denormalized files or tables and the acquisition order matches the foreign/primary key relationship for each table format data source, matches the order of data in each structured file and corresponds to a relationship that is linked to the denormalized attributes in each denormalized file or table.

8. A method for transforming and exchanging data between heterogeneous data sources comprising the steps of:

creating metadata that defines one or more delivery hierarchical data structures, the delivery order in which data organized according to the one or more delivery hierarchical data structures is delivered to the target data source such that the referential integrity constraints of the target data source are met, one or more acquisition data structures, transformations to transform data organized according to the one or more acquisition data structures to data organized according to the one or more delivery hierarchical data structures, the transformation order in which such transformations are performed in order to ensure that data organized according to the one or more delivery hierarchical data structures is created in the delivery order, and the acquisition order in which data organized according to the one or more acquisition data structures is acquired in order to ensure that transformations can be performed in the transformation order;

acquiring acquisition data organized according to the one or more acquisition data structures from the source data source in the acquisition order;

transforming acquisition data to delivery data according to the transformations; and delivering the delivery data to the target data source in the delivery order.

9. The method of claim 8 in which the acquiring step, the transforming step and the delivering step are run as three separate threads or processes.

* * * * *